United States Patent
Andres et al.

(10) Patent No.: US 9,219,789 B2
(45) Date of Patent: *Dec. 22, 2015

(54) LOCATING COMPUTER-CONTROLLED ENTITIES

(71) Applicant: INTERNATIONAL BUSINESS MACHINES CORPORATION, Armonk, NY (US)

(72) Inventors: Michael Andres, Holzgerlingen (DE); Dirk Bolte, Gaertringen (DE); Thomas Hess, Bad Liebenzell (DE); Markus Strasser, Metzingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,395

(22) Filed: Mar. 10, 2015

(65) Prior Publication Data

US 2015/0215411 A1    Jul. 30, 2015

Related U.S. Application Data

(63) Continuation of application No. 12/852,624, filed on Aug. 9, 2010, now Pat. No. 9,013,304.

(30) Foreign Application Priority Data

Aug. 12, 2009  (EP) ...................................... 09167688

(51) Int. Cl.
- *G08B 1/00* (2006.01)
- *G08B 25/00* (2006.01)
- *G01S 3/02* (2006.01)
- *G01S 1/00* (2006.01)
- *G06F 15/173* (2006.01)
- *H04L 29/08* (2006.01)
- *G08C 21/00* (2006.01)

(52) U.S. Cl.
CPC ................ *H04L 67/18* (2013.01); *G08C 21/00* (2013.01)

(58) Field of Classification Search
CPC ..... G01S 1/08; G01S 3/14; H04N 2201/3253; G06F 15/173
USPC ........ 340/539, 8.1, 539.32; 342/450; 709/223
See application file for complete search history.

(56) References Cited

U.S. PATENT DOCUMENTS

| | | | |
|---|---|---|---|
| 8,138,911 B2 * | 3/2012 | Collins et al. | 340/539.1 |
| 8,159,342 B1 * | 4/2012 | Medina et al. | 340/539.32 |
| 2003/0151506 A1 * | 8/2003 | Luccketti | 340/539.13 |
| 2007/0067434 A1 * | 3/2007 | Bahl | 709/223 |
| 2008/0143516 A1 | 6/2008 | Mock et al. | |
| 2008/0280624 A1 | 11/2008 | Wrappe | |
| 2010/0273504 A1 | 10/2010 | Bull et al. | |
| 2010/0286997 A1 | 11/2010 | Srinivasan | |

* cited by examiner

Primary Examiner — George Bugg
Assistant Examiner — Munear Akki
(74) Attorney, Agent, or Firm — Griffiths & Seaton PLLC

(57) ABSTRACT

A beacon device is provided in proximity to a computing system within a computing center. A request to locate the computing system in the computing center is triggered on a central control unit. In response to the request to locate the computing system, the control unit generates specification data for a unique radio signal identifier, sends an activation request and the specification data to the beacon device, and provides the specification data to a portable device and stores the specification data on the portable device. In response to receiving the activation request, the beacon device sends a radio signal identifier generated from the specification data.

14 Claims, 4 Drawing Sheets

LOCATING COMPUTER-CONTROLLED ENTITIES

CROSS-REFERENCE TO RELATED APPLICATIONS

The present application is a continuation of U.S. patent application Ser. No. 12/852,625 filed on Aug. 9, 2010.

CLAIM TO FOREIGN PRIORITY

This application claims priority to European Patent Application No. 09167688.2, filed Aug. 12, 2009 and entitled "Locating Computer-Controlled Entities."

BACKGROUND OF THE INVENTION

1. Field of the Invention

The present invention relates in general to computers, and more particularly to a method, system, and computer program product for locating computer-controlled entities.

2. Description of the Related Art

Large computing centers include a vast number of computing units and related equipment that are distributed within in a wide area (e.g. multiple floors, buildings, etc.). Typically, such large computing solutions have a central control unit, which enables the computing center personal to identify problems or guide repairs or configuration changes for computing units and related equipment.

If the central control unit and a computing unit are not in the same location, an individual, such as a computer administrator, technician or other user, has the responsibility to find the computing unit referenced by the control unit. Applying changes to the wrong computing unit may cause outages or malfunctions in the computing center. Therefore, the user often manually maintains a location plan where which computing unit is located. The user must read an identifier from the control unit (e.g. a barcode or a human-readable identifier) and save this identifier in the location plan at the right coordinates. The identifier can then also be used to retrieve the coordinates of the control unit from the location plan.

SUMMARY OF THE INVENTION

Various approaches to locating computing unit described previously may include the use of beacon devices to automatically locate the presence of computing units and to store the presence information in a central database. The potential disadvantage of these approaches includes the requirement to establish and maintain means for a coordinate system applicable to the computer center. Other implementations may be costly or provide other potential disadvantages.

In view of the foregoing, a need exists for a mechanism for locating computer entities without the associated potential disadvantages previously described. Accordingly, various embodiments for locating a computing system within a computing center using a processor device are provided. A beacon device is provided in proximity to the computing system. A request to locate the computing system is triggered on a central control unit. In response to the request to locate the computing system, the control unit generates specification data for a unique radio signal identifier, sends an activation request and the specification data to the beacon device, and provides the specification data to a portable device via a network connection by the control unit, the portable device being separate from the control unit, and stores the specification data on the portable device. In response to receiving the activation request, the beacon device on the computing system sends a radio signal identifier generated from the specification data, and receives signals on the portable device from the beacon device of the computing system and compares the received signals with the specification data stored on the portable device. Based on the results of the comparison by the portable device, location information of the computing system is provided.

Related embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
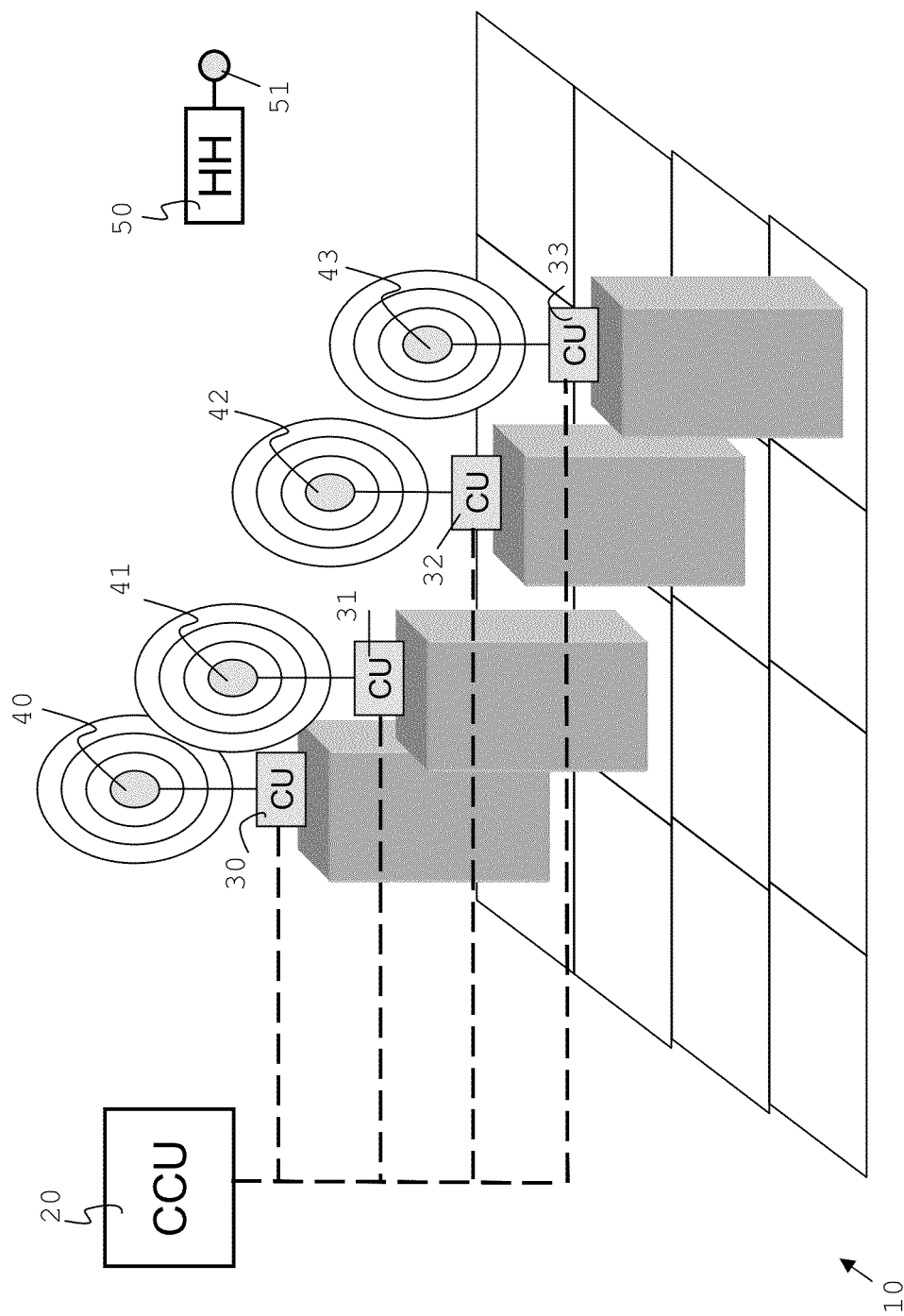
FIG. 1 is a block diagram of a computing center, in which aspects of the following description and claimed subject matter may be implemented.

FIG. 1 shows an exemplary computing center 10 with a central control unit 20, in which various aspects of the present invention may be implemented. In the depicted embodiment, the central control unit (CCU) 20 is connected (wire or non-wire based) to different computing units (CU) 30, 31, 32, 33. For example, a wire-based connection can be implemented using Ethernet network connections. The computing units 30, 31, 32, 33 are equipped with an identical beacon device 40, 41, 42, 43 respectively. The computing units 30, 31, 32, 33 can control their associated beacon devices, e.g. via a simple hardware interface. A portable handheld (HH) device 50 is used by the service personnel of the computer center to locate the computing units 30, 31, 32, and 33. The handheld device 50 comprises an antenna 51 to receive radio frequency signals.

In one embodiment the computing units 30, 31, 32, 33 are equipped with an embedded service processor each, which maintains the connection to the central control unit 20 and controls the associated beacon device in addition to the execution of other system control tasks required for the computing unit. The service processors are connected to the central control unit 20 via Ethernet connections. The central control unit 20 may be a personal computer or a workstation, for example, among other computing devices.

The beacon devices 40, 41, 42, 43 are able to emit radio signal identifiers when triggered by the associated computing units 30, 31, 32, 33. A radio signal identifier is similar to a regular radio signal. The signal of the radio signal identifier is sent on a frequency known to the central control unit 20. Its strength may be chosen to cover only the area of the computing center 10, or may vary according to a particular implementation.

Figure 2:
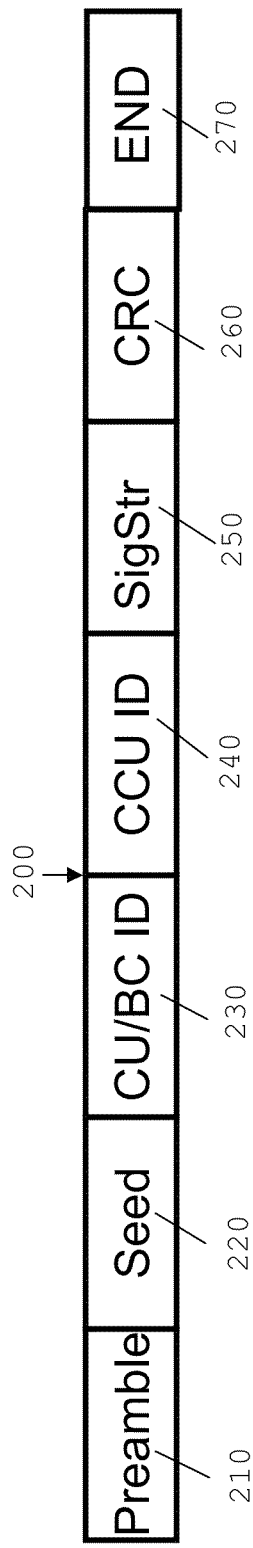
FIG. 2 is a block diagram illustrating an exemplary radio signal identifier in accordance with the present invention.

FIG. 2 shows the composition of an exemplary radio signal identifier (RSI) 200 in accordance with one embodiment of the present invention. A specific preamble 210 is used such that the radio signal identifier 200 can be detected when searching for the corresponding signal. The preamble is followed by a seed 220, which is a random value, which should not be used again when it is used by a running location determination process. The seed 220 is followed by a unique identifier (CU/BC ID) 230, which represents the combination of the particular computing unit and its associated beacon device. The unique identifier 230 is followed by a world-wide unique identifier (CCU ID) 240 for the central control unit 20. This world-wide unique identifier 240 can be based on other world-wide unique identifiers. For example, the Media-Access-Control (MAC) address of an Ethernet adapter of the central control unit 20 can be used as the world-wide unique identifier 240. The world-wide unique identifier 240 is followed by the signal strength (SigStr) 250, which represents the signal strength of the sender of the radio signal identifier 200. The signal strength 250 is followed by a CRC (Cyclic Redundancy Check) field 260 for error detection and an end marker 270, which indicates the end of the radio signal identifier 200.

In one embodiment, the handheld 50 is a regular personal digital assistant (PDA) equipped with a rotating antenna 51 and a two-dimensional flat screen display, although one of ordinary skill will appreciate that other handheld or mobile devices, such as tablets, phones, laptop or other mobile computing devices or platforms, and the like. Again, in one embodiment, the handheld 50 executes a special computer program, which interprets the signal data received by the antenna 51 if it matches the radio signal identifier 200 stored in a memory of the handheld 50. Based on the result of the matching test, the handheld computer program uses signal strength data, signal strength data over time/movement, and signal propagation delay data, as an input to state of the art algorithms in order to provide graphical direction and distance information, signal strength data, and signal propagation delay data on the display of the handheld 50. In one embodiment, the signal strength data and the signal propagation delay data are used by the handheld computer program to provide the current distance to the computing unit on the display.

Instead of, or in addition to, the visual information displayed on the display of the handheld 50, the handheld computer program may provide an audible feedback signal to the user for informing the user, when moving, whether the relative position of the computing unit is getting closer to the handheld 50 or farther to the handheld 50.

Figure 3:
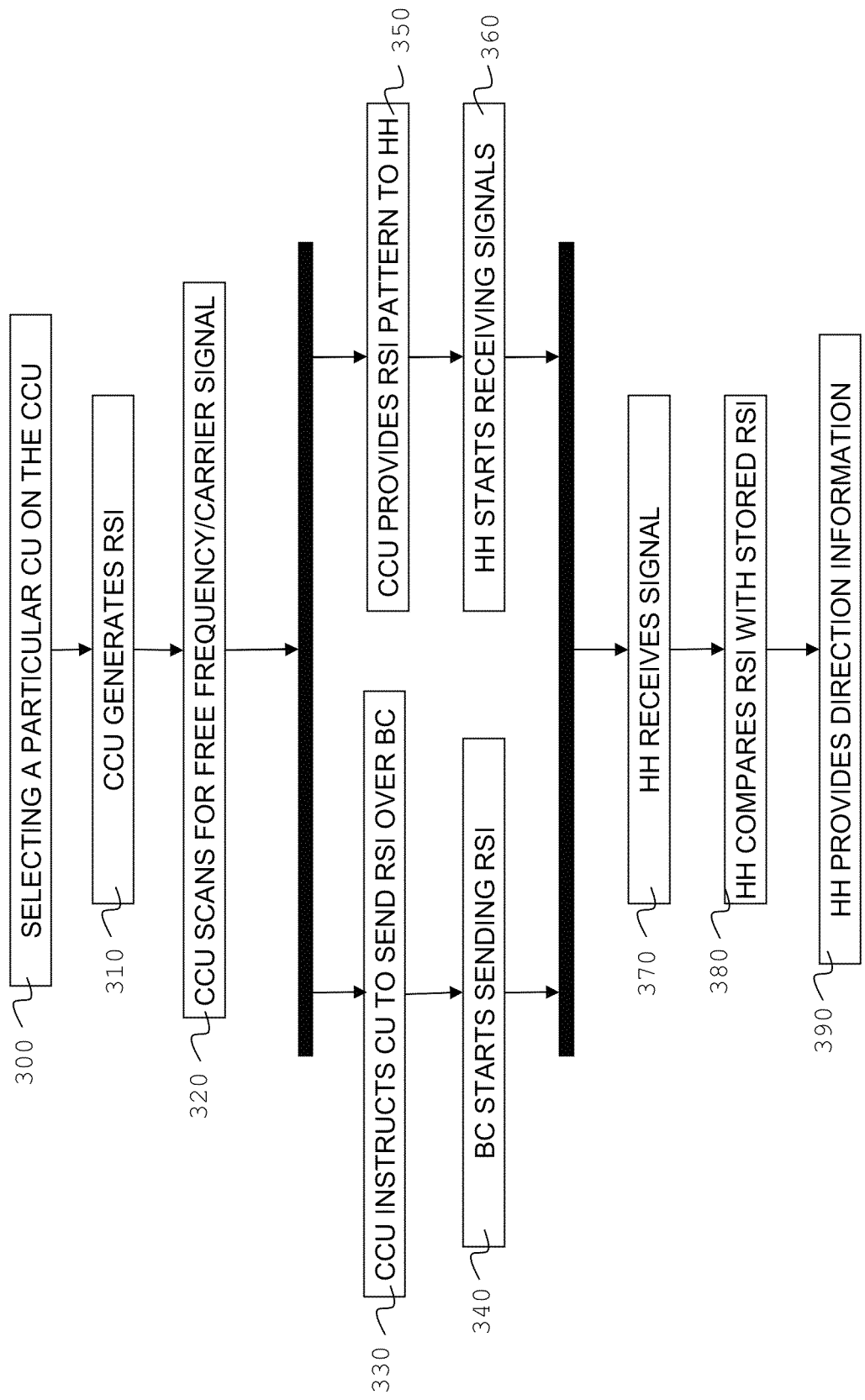
FIG. 3 is a flow chart diagram of an exemplary method for locating a computer-controlled entity according to various aspects of the present invention.

FIG. 3, following, illustrates an exemplary method for locating a computer-controlled entity according to one embodiment of the present invention. In step 300 a technician from the service personnel of the computing center 10 selects a particular computing unit on the central control unit 20, which executes a special computer program for this purpose. In an alternate embodiment of the invention the particular computing unit may be selected in the control unit computer program by different computer programming means via an Application Programming Interface (API) instead. Based on the particular computing unit selected, the control unit computer program generates the data for a radio signal identifier in step 310. Then in step 320, the control unit computer program scans for a free frequency on which the radio signal identifier can be sent. In an alternate embodiment, the control unit computer program scans for a free carrier signal, which can be used to transmit the radio signal identifier in step 320.

In step 330 the control unit computer program instructs the selected computing unit to send a radio signal identifier based on the generated radio signal identifier data and the determined frequency/signal carrier over its beacon device. When the service processor of the computing unit has received this request together with the generated radio signal identifier data and frequency/signal carrier from the central control unit 20, the service processor triggers in step 340 the beacon device of its computing unit to send the corresponding radio signal identifier.

Independent of step 330, the control unit computer program provides the generated radio signal identifier data to the handheld 50 in step 350. The generated radio signal identifier data can be provided manually to the handheld 50 via memory cards programmed by the central control unit 20 or automatically via some interface connection such as Wireless Local Area Network (WLAN), Bluetooth, Infrared, Universal Serial Bus (USB) or similar means for synchronizing PDAs with other computing devices (e.g. Personal Computers). When the handheld 50 has obtained and stored the generated radio signal identifier data from the central control unit 20, the handheld computer programs starts to receive signals in step 360. When the handheld computer program received a signal in step 370, the handheld computer program compares the received signal with the stored radio signal identifier data in step 380. Based on the results of the comparison in step 380, the handheld computer program provides corresponding direction information.

Figure 4:
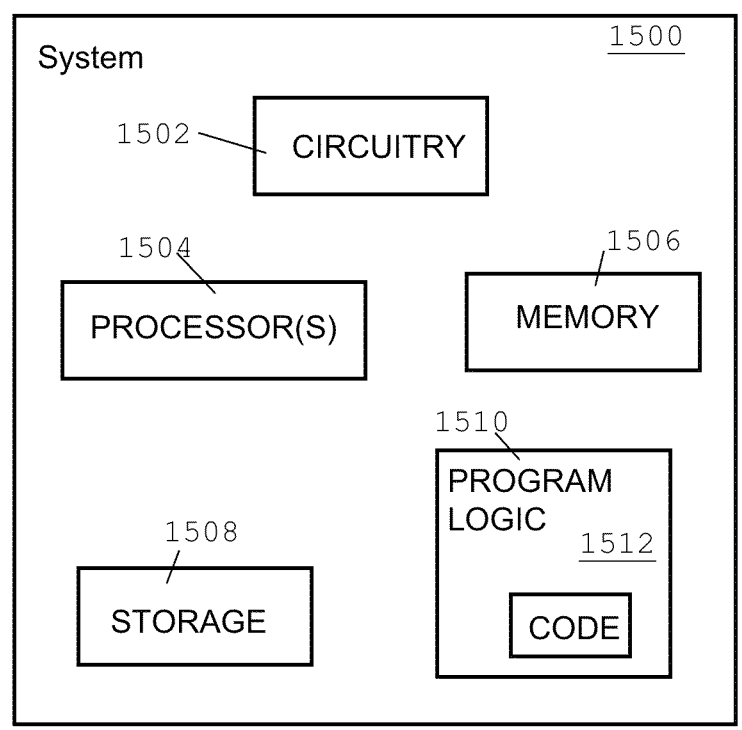
FIG. 4 is a block diagram of a system, including at least one processor device, in which aspects of the present invention and following claimed subject matter may be implemented.

FIG. 4, following, is a block diagram of an exemplary computer system 1500 in which certain embodiments may be implemented. The system 1500 may include a circuitry 1502 that may in certain embodiments include a microprocessor 1504. The computer system 1500 may also include a memory 1506 (e.g., a volatile memory device), and storage 1508. The storage 1508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1508 may comprise an internal storage device, an attached storage device and/or a network accessible storage device. The system 1500 may include a program logic 1510 including code 1512 that may be loaded into the memory 1506 and executed by the microprocessor 1504 or circuitry 1502. In certain embodiments, the program logic 1510 including code 1512 may be stored in the storage 1508. In certain other embodiments, the program logic 1510 may be implemented in the circuitry 1502. Therefore, while FIG. 4 shows the program logic 1510 separately from the other elements, the program logic 1510 may be implemented in the memory 1506 and/or the circuitry 1502.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for locating a computing system within a computing center using a processor device, comprising:
providing a beacon device in proximity to said computing system;
triggering a request to locate said computing system on a central control unit;
in response to the request to locate said computing system, said control unit:
generating specification data for a unique radio signal identifier,
sending an activation request and said specification data to said beacon device, and
providing said specification data to a portable device via a network connection by said control unit, the portable device being separate from said control unit, and storing said specification data on the portable device;
in response to receiving said activation request, said beacon device on said computing system sending a radio signal identifier generated from said specification data; and receiving signals on said portable device from said beacon device of said computing system and comparing the received signals with the specification data stored on the portable device, and based on the results of the comparison by said portable device, providing location information of said computing system.

2. The method of claim 1, wherein said computing system includes a computing unit.

3. The method of claim 1, further including:
receiving said activation request from said control unit, and
in response to receiving said activation request, triggering said beacon device to send said radio signal identifier.

4. The method of claim 1, wherein said radio signal identifier includes a unique identifier derived from a unique identifier for said control unit and said beacon device.

5. A system for locating a computing system within a computing center, comprising:
at least one processor device, operable in the computing environment, wherein the processor device:
provides a beacon device in proximity to said computing system,
triggers a request to locate said computing system on a central control unit,
in response to the request to locate said computing system, said control unit:
generates specification data for a unique radio signal identifier,
sends an activation request and said specification data to said beacon device, and
provides said specification data to a portable device via a network connection by said control unit, and stores said specification data on the portable device, the portable device being separate from said central control unit,
in response to receiving said activation request, said beacon device on said computing system sends a radio signal identifier generated from said specification data, and
receives signals on said portable device from said beacon device of said computing system and comparing the received signals with the specification data stored on the portable device, and based on the results of the comparison by said portable device, provides information of said computing system.

6. The system of claim 5, further including a computing unit incorporated into said computing system.

7. The system of claim 5, wherein the at least one processor device:
receives said activation request from said control unit, and
in response to receiving said activation request, triggering said beacon device to send said radio signal identifier.

8. The system of claim 5, wherein said radio signal identifier includes a unique identifier derived from a unique identifier for said control unit and said beacon device.

9. The system of claim 5, wherein said portable device is one of a personal digital assistant (PDA), tablet, phone, laptop computer, and mobile computing device.

10. The system of claim 9, further including a rotating antenna coupled to the one of the PDA, tablet, phone, laptop computer, and mobile computing device for receiving the signals.

11. A computer program product for locating a computing system within a computing center, the computer program product comprising a non-transitory computer-readable storage medium having computer-readable program code portions stored therein, the computer-readable program code portions comprising:
a first executable portion that operates a beacon device in proximity to said computing system;
a second executable portion that triggers a request to locate said entity on a central control unit;
a third executable portion that, in response to the request to locate said computing system, said control unit:
generates specification data for a unique radio signal identifier,
sends an activation request and said specification data to said beacon device, and
provides said specification data to a portable device via a network connection by said control unit, and storing said specification data on the portable device, the portable device being separate from said central control unit;
a fourth executable portion that sends, in response to receiving said activation request, a radio signal identifier generated from said specification data using said beacon device on said computing device;
a fifth executable portion that receives signals on said portable device from said beacon device of said entity and compares said received signals with said specification data stored on said portable device, and based on the results of the comparison by said portable device, providing location information of said computing system.

12. The computer program product of claim 11, wherein said computing center includes a computing unit.

13. The computer program product of claim 11, further including a sixth executable portion that:
receives said activation request from said control unit, and
in response to receiving said activation request, triggers said beacon device to send said radio signal identifier.

14. The computer program product of claim 11, wherein said radio signal identifier includes a unique identifier derived from a unique identifier for said control unit and said beacon device.

* * * * *